United States Patent
Moritani

(10) Patent No.: US 7,693,328 B2
(45) Date of Patent: Apr. 6, 2010

(54) PRINTING APPARATUS, PRINTING PROCESSING METHOD, AND STORAGE MEDIUM

(75) Inventor: Masamitsu Moritani, Yamatokoriyama (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 849 days.

(21) Appl. No.: 11/519,396

(22) Filed: Sep. 11, 2006

(65) Prior Publication Data

US 2007/0058198 A1 Mar. 15, 2007

(30) Foreign Application Priority Data

Sep. 12, 2005 (JP) .............................. 2005-264472

(51) Int. Cl.
*G06K 9/00* (2006.01)
(52) U.S. Cl. ...................................... 382/166; 382/232
(58) Field of Classification Search ......... 382/162–166, 382/232, 233, 235, 240; 358/1.15, 515, 539
See application file for complete search history.

(56) References Cited

U.S. PATENT DOCUMENTS

| | | | |
|---|---|---|---|
| 6,272,252 B1 * | 8/2001 | Eldridge et al. | ............. 382/232 |
| 6,795,208 B1 | 9/2004 | Tanaka | |
| 7,035,469 B2 * | 4/2006 | Laaksonen | ................... 382/232 |
| 2005/0018251 A1 | 1/2005 | Tanaka | |
| 2006/0039032 A1 | 2/2006 | Tanaka | |

FOREIGN PATENT DOCUMENTS

| | | |
|---|---|---|
| JP | 06-191101 | 7/1994 |
| JP | 08-098034 | 4/1996 |
| JP | 09-188041 | 7/1997 |
| JP | 9-193482 A | 7/1997 |
| JP | 2000-022909 A | 1/2000 |
| JP | 2001-113759 A | 4/2001 |
| JP | 2005-151255 | 6/2005 |

* cited by examiner

*Primary Examiner*—Duy M Dang
(74) *Attorney, Agent, or Firm*—Edwards Angell Palmer & Dodge LLP; David G. Conlin; David A. Tucker

(57) ABSTRACT

A printing apparatus includes a hard disk, an image compressing device, an image decompressing device, and a printing engine. The printing apparatus divides image data into plural pieces of divided image data, classifies one or more pieces of the divided image data as compressible image data and classifies one or more other pieces of the divided image data as non-compressible image data. In storing the image data in a storage section, the printing apparatus causes the image compressing device to compress the compressible image data and writes the compressible image data thus compressed into the hard disk, and writes the non-compressible image data into the hard disk. Further, in causing the printing engine to perform printing, the printing apparatus reads out the non-compressible image data and the compressible image data thus compressed from the hard disk, transmits the non-compressible image data to the printing engine, causes the image decompressing device to decompress the compressible image data thus read, and transmits the compressible image data thus decompressed to the printing engine. This makes it possible to realize a printing speed higher than in a conventional technique, without increase in the cost and technical difficulties in packaging and controlling.

8 Claims, 7 Drawing Sheets

FIG. 6

| |
|---|
| DATA 1 (0.1Mbyte) |
| DATA 2 (0.1Mbyte) |
| DATA 3 (0.1Mbyte) |
| DATA 4 (0.1Mbyte) |
| DATA 5 (0.1Mbyte) |
| DATA 6 (0.1Mbyte) |
| DATA 7 (0.1Mbyte) |
| DATA 8 (0.1Mbyte) |
| ⋮ |
| DATA 600 (0.1Mbyte) |

PRINTING APPARATUS, PRINTING PROCESSING METHOD, AND STORAGE MEDIUM

This non-provisional application claims priority under 35 U.S.C. §119(a) on patent application Ser. No. 264472/2005 filed in Japan on Sep. 12, 2005, the entire contents of which are hereby incorporated by reference.

FIELD OF THE INVENTION

The present invention relates to a printing apparatus which includes: a storage section in which image data is stored; image compressing means for compressing the image data; image data decompressing means for decompressing the compressed image data; and a printing engine for performing printing on the basis of the image data.

BACKGROUND OF THE INVENTION

There has been known an image data processing device which temporarily stores a large amount of image data in a hard disk, and performs printing on the basis of the image data read out from the hard disk (see Patent Document 1: Japanese Unexamined Patent Publication No. 191101/1994 (Tokukaihei 6-191101: published on Jul. 12, 1994)) and Patent Document 2: Japanese Unexamined Patent Publication No. 98034/1996 (Tokukaihei 8-98034: published on Apr. 12, 1996).

The image data processing device allows for a so-called electronic sorting function in which: even when plural copies of image data corresponding to plural pages are printed, the image data is temporarily stored into the hard disk and the image data is read out in the order of pages so that the plural copies of image data are printed.

However, a processing speed (access speed) at which writing/reading of data is carried out into/from the hard disk is very low, as compared with an access speed to a memory. As a result, there occurs such a problem that: even though a processing speed of a printing engine is made faster, the speed of reading data from the hard disk does not catch up with the processing speed of the printing engine, so that a target printing job ability cannot be achieved.

FIG. 7 is a data flow showing a case where image data is temporarily written into the hard disk and the image data is read from the hard disk so that a printing is performed.

Note that, FIG. 7 is an example corresponding to a case where a maximum processing speed of the hard disk is 60 [Mbyte/sec] and an amount of image data per 1 page is 60 [Mbyte/sec]. Further, note that in a case where the maximum processing speed of the hard disk is 60 [Mbyte/sec], when assuming that the same amount of image data is written into and read from the hard disk at a time, each of the maximum writing and reading process speeds is 30 [Mbyte/sec].

As illustrated in FIG. 7, a CPU stores the image data in a memory and then writes the image data into the hard disk. In this case, a maximum processing speed at which the data is written into the hard disk is 30 [Mbyte/sec].

On the other hand, the printing engine reads out the image data from the hard disk to store the image data in the memory, and then performs a printing process on the basis of the image data thus read out. In this case, a maximum speed at which the data is read out is 30 [Mbyte/sec] as described above. Namely, the printing engine performs a printing at a data processing speed of 30 [Mbyte/sec].

Therefore, a printing speed indicative of the number of printed pages per unit time (e.g. per 1 minute) is found as follows.

Printing speed: 60 [sec/min]÷(60 [Mbyte/page]÷30 [Mbyte/sec])=30 [page/min]

Here, it is assumed that the amount of data to be written into is the same as the amount of data to be read out. If printing is performed while data is only read out at a speed of 60 [Mbyte/sec], then a printing speed is temporarily 60 [page/min], which is twice as large as the above printing speed. However, no printing can be performed after one (1) job has been finished and before image data for a following job is written into the hard disk. This does not allow a total of a plurality of jobs to have a printing speed of 60 [page/min]. Therefore, in a case where a printing speed is defined as a speed at which a printing is continuously carried out for a plurality of jobs, it is necessary to simultaneously carry out (i) reading out of image data for a current printing job from the hard disk and (ii) writing of image data for a following printing job into the hard disk. Further, in a case of repeat printing, data once written into the hard disk is read out, and the printing is carried out based on the data thus read out in accordance with the number of required copies. Accordingly, the amount of data written into the hard disk is not equal to the amount of data read out from the hard disk. However, here, there is assumed a case of one-copy printing in which the largest amount of data is dealt with during writing and reading operation. Accordingly, it is assumed that the amount of data to be written into is equal to the amount of data to be read out.

In this way, a printing speed depends on a processing speed of a hard disk. Therefore, Patent Documents 1 and 2 disclose a technique in which: in order to increase a printing speed, image data is subjected to a compressing process by use of an image compressing device before the image data is stored in a hard disk, and the image data is subjected to a decompressing process by use of an image decompressing device after the image data is read from the hard disk, and then the image data is subjected to a printing process.

FIG. 8 is a data flow showing a case where a compressing/decompressing process is performed. Here, it is assumed that an image compressing device has a compressing speed of 60 [Mbyte/sec]. Further, it is assumed that the image decompressing device has a compressing rate of ⅙ at which image data is compressed. Further, it is assumed that image decompressing device has a decompressing speed of 60 [Mbyte/sec].

As illustrated in FIG. 8, image data which has been subjected to a ⅙ compressing process by the image compressing device is written into the hard disk at a speed of 10 [Mbyte/sec]. Similarly, because the image decompressing device has a decompressing speed of 60 [Mbyte/sec], the image data is read out from the hard disk at a speed of 10 [Mbyte/sec]. The image decompressing device performs a decompressing process and transmits the image data to the printing engine at a speed of 60 [Mbyte/sec]. Namely, the printing engine performs printing at a data processing speed of 60 [Mbyte/sec].

Therefore, when assuming that the amount of image data per 1 page is 60 [Mbyte/page] as with FIG. 7, a printing speed is found as follows.

Printing speed: 60 [sec/min]÷(60 [Mbyte/page]÷60 [Mbyte/sec])=60 [page/min]

This shows that the printing speed is increased as compared with an arrangement in which no image compressing device and no image decompressing device are provided.

Note that, in Patent Document 1, in order to reduce the amount of data flowing in an internal bus, image data is sent from the image decompressing device to the printing engine not via the internal bus but via a special data bus. Further, according to Patent Document 2, in a case of using a plurality of image compressing devices and image decompressing devices, a compressing method and a compressing rate are specified with respect to each image compressing device so that each image compressing device generates encoded data having substantially the same size. This allows for preventing a reduction in a speed at which specific encoded data is written into the hard disk and in a speed at which specific data is read out from the hard disk.

The above technique is based on the premise that each of the compressing speed and decompressing speed is higher than a target printing processing speed. In other words, the limit of the performance of the printing process is determined based on the performance limits of the image compressing device and the image decompressing device.

Particularly, recently, as a printing engine gets speedy, each of processing speeds of an image compressing device, an image decompressing device, and a hard disk is becoming a bottleneck with respect to the processing speed of a printing apparatus.

One countermeasure against the bottleneck is to use an image compressing device, an image decompressing device, or a hard disk, each of which can carry out a process at a higher speed, or to simultaneously use at least two which are selected from a group consisting of the image compressing device, the image decompressing device, and the hard disk. However, this countermeasure gives rise to an increase in the cost and to technical difficulties in packaging and controlling.

SUMMARY OF THE INVENTION

The present invention was made in view of the foregoing problems. An object of the present invention is to provide a printing apparatus, a printing processing method, a printing processing program, and a storage medium, each of which realizes a higher printing speed than that of the conventional techniques, without increase in the cost and technical difficulties in packaging and controlling.

In order to achieve the foregoing object, the printing apparatus according to the present invention is a printing apparatus, which includes a storage section which stores image data therein, image compressing means for compressing image data, image decompressing means for decompressing compressed image data, and a printing engine for performing printing on the basis of image data, the printing apparatus comprising: dividing means for dividing image data into plural pieces of divided image data; compression/non-compression determining means for classifying one or more pieces of the divided image data as compressible image data and classifying other part of the divided image data as non-compressible image data; writing means for causing the image compressing means to compress the compressible image data, writing the compressible image data thus compressed into the storage section, and for writing the non-compressible image data into the storage section; and reading means for reading the non-compressible image data and the compressible image data thus compressed from the storage section, transmitting the non-compressible image data thus read to the printing engine, causing the image decompressing means to decompress the compressible image data thus compressed, and transmitting the compressible image data thus decompressed to the printing engine.

With the arrangement, the compressible image data, which is a part of the image data, is stored in the storage section after being compressed by the image compressing device. Here, the speed at which the compressible image data which has been compressed is written into the storage section is a value obtained by multiplying a compressing process speed of the image compressing device by a compressing rate of the compressible image data which has been compressed. The non-compressible image data, which is the rest of the image data, is stored in the storage section without being compressed. Therefore, the non-compressible image data can be written into the storage section at the speed obtained by subtracting (i) a writing process speed at which the compressible image data which has been compressed is written into the storage section from (ii) the maximum speed at which the image data is written into the storage section. Consequently, it is possible to increase the amount of image data written per unit time into the storage section, compared with a conventional technique in which the entire image data is compressed and then written in the storage section.

Further, in causing the printing engine to perform printing, the printing apparatus reads out the non-compressible image data and the compressible image data which has been compressed from the storage section, transmits the non-compressible image data to the printing engine, causes the image decompressing device to decompress the compressible image data, and transmits the compressible image data which has been decompressed to the printing engine. Here, the speed at which the compressible image data which has been compressed is read out from the storage section is a value obtained by multiplying a decompressing process speed of the image decompressing device and a compressing rate of the compressible image data which has been compressed. The non-compressible image data can be read out from the storage section at the speed obtained by subtracting (i) a reading process speed at which the compressible image data which has been compressed is read out from the storage section from (ii) the maximum speed at which the image data is read out from the storage section. This makes it possible to increase the amount of image data read out per unit time from the storage section, compared with a conventional technique in which the entire image data is compressed and then written in the storage section. Consequently, it is possible to increase printing speed of the printing engine.

As described above, it is possible to increase the printing speed, without increasing each processing power of the image compressing device, the image decompressing device, and the storage section. As a result, it is possible to realize a printing speed higher than in a conventional technique, without increase in the cost and technical difficulties in packaging and controlling.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 6 illustrates an example of pieces of divided image data in Example 3.

DESCRIPTION OF THE EMBODIMENTS

Figure 1:
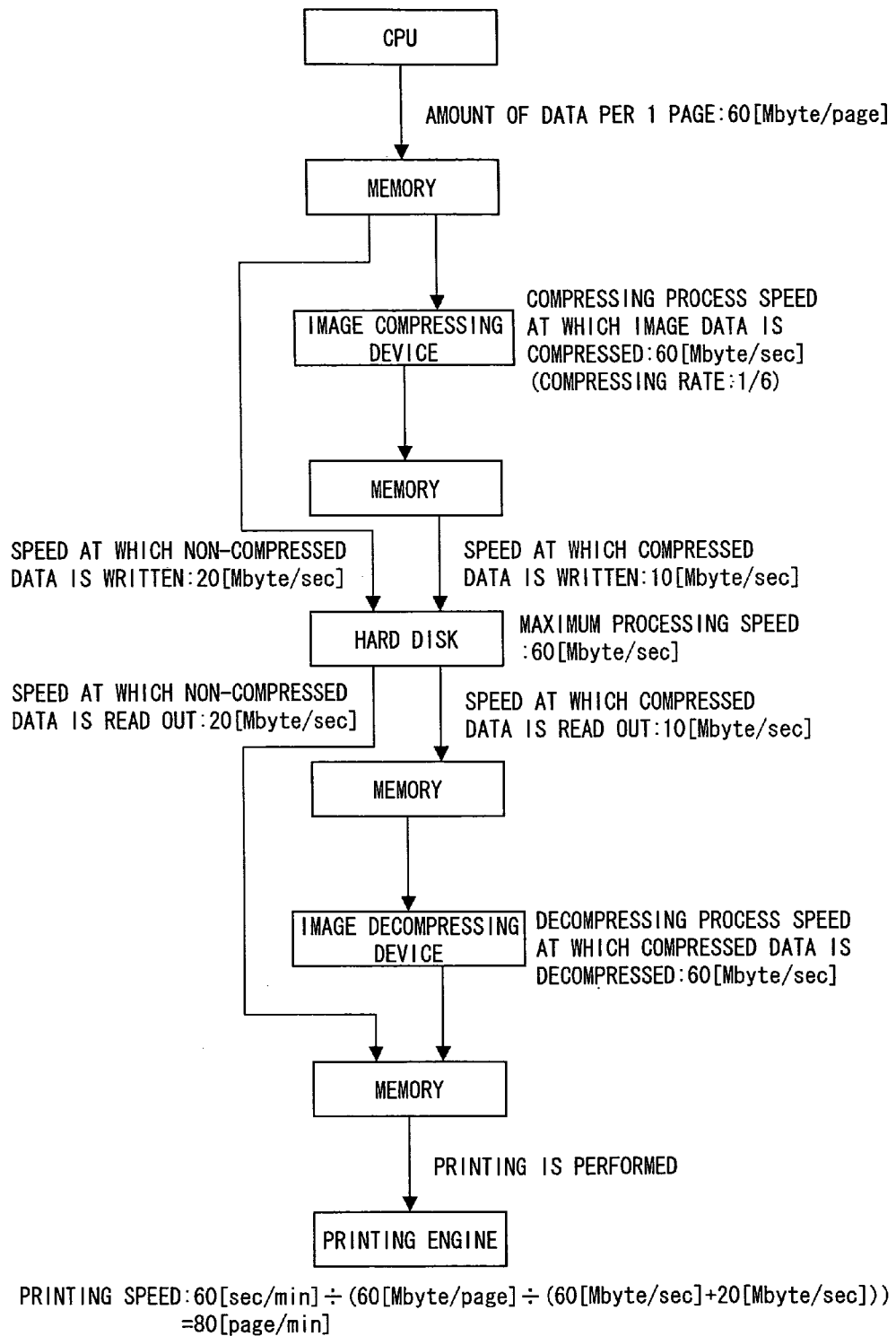
FIG. 1 is a data flow chart illustrating a flow of image data according to an embodiment of the present invention.
Figure 2:
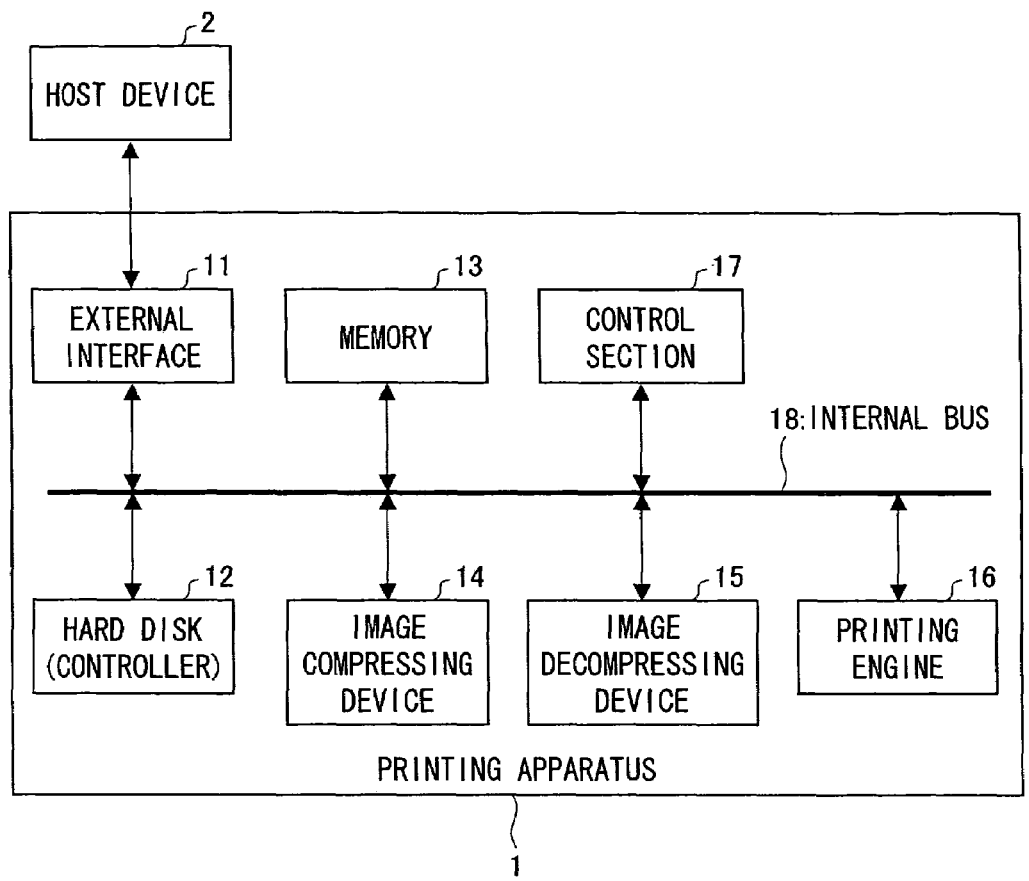
FIG. 2 is a block diagram illustrating an internal structure of a printing apparatus according to the present invention.

With reference to FIGS. 1 to 5, the following explains an embodiment of the present invention. FIG. 2 is a block diagram illustrating a structure of a printing apparatus 1 according to the present embodiment. As illustrated in FIG. 2, the printing apparatus 1 is connected with a host device 2 and acquires printing data from the host device 2.

The host device 2 is a personal computer for example and the host device 2 is installed a document creating software. The host device 2 outputs, to the printing apparatus 1, printing data such as a document prepared with the use of the document creating software.

As illustrated in FIG. 2, the printing apparatus 1 includes an external interface 11, a hard disk (storage section) 12, a memory 13, an image compressing device (image compressing means) 14, an image decompressing device (image decompressing means) 15, a printing engine 16, a control section 17, and an internal bus 18 via which the constituent members are connected with each other.

The external interface 11 is connected with the host device 2 and acquires from the host device 2 printing data such as a printer description language.

The hard disk 12 stores image data and has a maximum processing speed of 60 [Mbyte/sec].

The memory 13 temporarily stores printing data which the external interface 11 has received from the host device 2. The memory 13 also serves as a work area for the control section 17.

The image compressing device 14 compress the image data so as to prepare compressed image data, by encoding image data specified by the control section 17. Note that, in the present embodiment, the image compressing device 14 has a compressing process speed of 60 [Mbyte/sec].

The image decompressing device 15 performs a decompressing process for decoding the compressed image data read out from the hard disk 12. In the present embodiment, the image decompressing device 15 has a decompressing speed of 60 [Mbyte/sec].

The printing engine 16 performs a printing process (printing) in accordance with image data.

The control section 17 converts the printing data, which the external interface 11 has acquired from the host device 2, into image data such as a bit map. Further, the control section 17 temporarily stores the image data into the hard disk 12, suitably reads out image data from the hard disk 12, and transmits the image data thus read out to the printing engine 16 so that the image data is subjected to a printing process.

Further, the control section 17 divides image data into plural pieces of divided image data and classifies each of the divided image data into (i) compressible image data and (ii) non-compressible image data. Further, the control section 17 causes the image compressing device 14 to compress the compressible image data and then stores it into the hard disk 12. On the other hand, the control section 17 stores the non-compressible image data into the hard disk 12 without compressing it.

The control section 17 includes a CPU and a program memory in which a process program is stored. The CPU performs a process based on a process program stored in the program memory.

Figure 3:
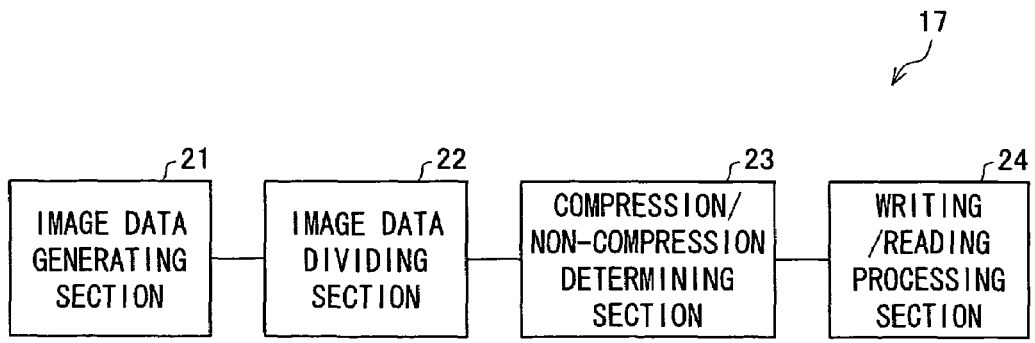
FIG. 3 is a functional block diagram illustrating a structure of a control section included in the printing apparatus.

Next, the following explains an internal structure of the control section 17. FIG. 3 is a functional block diagram illustrating the internal structure of the control section 17. As illustrated in FIG. 3, the control section 17 includes an image data generating section 21, an image data dividing section (dividing means) 22, a compression/non-compression determining section (compression/non-compression determining means) 23, and a writing/reading processing section (writing means, reading means) 24.

The image data generating section 21 analyzes printing data which the external interface 11 has acquired from the host device 2, and converts the printing data into image data such as a bit map.

The image data dividing section 22 divides the image data generated by the image data generating section 21 into plural pieces of divided image data.

The compression/non-compression determining section 23 determines whether or not each of the divided image data generated by the image data dividing section 22 is to be subjected to the compressing process. A divided image data determined by the compression/non-compression determining section 23 to be subjected to the compressing process is regarded as compressible image data. A divided image data determined by the compression/non-compression determining section 23 not to be subjected to the compressing process is regarded as non-compressible image data.

The writing/reading processing section 24 causes the image compressing device 14 to compress the compressible image data which has been determined by the compression/non-compression determining section 23, and causes the hard disk 12 to store the compressible image data (compressed image data) which has been compressed by the writing/reading processing section 24. Further, the writing/reading processing section 24 (i) reads out compressed image data from the hard disk 12, (ii) causes the image decompressing device 15 to decompress the compressed image data thus read out, and (iii) transmits the image data thus decompressed to the printing engine 16.

Further, the writing/reading processing section 24 causes the hard disk 12 to store the non-compressed image data which has been determined by the compression/non-compression determining section 23. Further, the writing/reading processing section 24 reads out the non-compressible image data from the hard disk 12, and transmits it to the printing engine 16.

Examples of each component of the control section 17 are detailed later.

Here, with reference to a data flow chart shown in FIG. 1, the following explains a flow of image data in the present embodiment.

Note that, it is assumed that an amount of image data per 1 page is 60 [Mbyte/page] and a compressing rate at which the image compressing device 14 compresses compressible image data which has been determined by the compression/non-compression determining section 23 is ⅙.

Here, the image compressing device 14 has a compressing process speed of 60 [Mbyte/sec], and a compressing rate at which compressible image data is compressed is ⅙. It follows that a writing process speed at which the compressed image data is written into the hard disk 12 is 10 [Mbyte/sec].

Further, the writing/reading processing section 24 reads out the compressed image data from the hard disk 12, and causes the image decompressing device 15 to decompress the compressed image data thus read out, and then the writing/reading processing section 24 transmits the image data thus decompressed to the printing engine 16.

Here, the decompressing process speed of the image decompressing device 15 is 60 [Mbyte/sec] and the compressing rate of the compressed image data is ⅙. It follows that a reading process speed at which the compressed image data is read out from the hard disk 12 is 10 [Mbyte/sec].

As described above, both of the writing process speed and the reading process speed of the compressed image data is 10 [Mbyte/sec], and a maximum process speed of the hard disk 12 is 60 [Mbyte/sec]. This allows the hard disk 12 to additionally perform other process which corresponds to 40 [Mbyte/sec].

For that reason, the writing/reading processing section 24 causes the hard disk 12 to simultaneously perform writing/reading of compressed image data and writing/reading of non-compressible image data. Here, since the writing/reading processing section 24 simultaneously performs a process of writing the non-compressible image data and a process of reading the non-compressible image data, the writing/reading processing section 24 writes and reads the non-compressible image data into/from the hard disk 12 at a speed of 20 [Mbyte/sec] (=40 [Mbyte/sec]÷2) at the same time. The writing/reading processing section 24 transmits the non-compressible image data which has been read out from the hard disk 12 to the printing engine 16.

As described above, the compressible image data which has been decompressed by the image decompressing device 15 is sent to the printing engine 16 at a speed of 60 [Mbyte/sec], while the non-compressible image data is sent from the hard disk 12 to the printing engine 16 at a speed of 20 [Mbyte/sec]. This allows the printing engine 16 to perform printing at a data processing speed of 80 [Mbyte/sec] (=60 [Mbyte/sec]+ 20 [Mbyte/sec]).

Under the circumstances, a printing speed indicative of the number of printed pages per unit time is as follows: 60 [sec/min]÷(60 [Mbyte/page]÷(60 [Mbyte/sec]+20 [Mbyte/sec]) =80 [page/min].

As described above, the printing apparatus 1 according to the present embodiment includes: a hard disk 12 in which image data is stored; an image compressing device 14 which compresses the image data; an image decompressing device 15 which decompresses the image data thus compressed; and a printing engine 16 which performs printing in accordance with the image data. The printing apparatus 1 further includes: an image data dividing section 22 which divides image data into plural pieces of divided image data; a compression/non-compression determining section 23 which classifies one ore more pieces of the divided image data as the compressible image data, and classifies one ore more other pieces of the divided image data as the non-compressible image data; and a writing/reading processing section 24 (i) which causes, in storing image data into the hard disk 12, the image compressing device 14 to compress and write (a) compressible image data and (b) non-compressible image data into the hard disk 12 into the hard disk 12, and (ii) which, in causing the printing engine 16 to perform printing, reads out from the hard disk 12 the non-compressible image data and the compressible image data which has been compressed, transmits the non-compressible image data to the printing engine 16, causes the image decompressing device 15 to decompress the compressible image data which has been compressed, and transmits to the printing engine 16 the compressible image data which has been decompressed.

As described above, the hard disk 12 performs writing/reading of compressed image data obtained by compressing compressible image data, and the hard disk 12 performs writing/reading of non-compressible image data. This allows the hard disk 12 to perform, with full processing power, efficient writing/reading of image data. This allows an increase in an amount of image data to be transmitted to the printing engine 16 per unit time, as compared with a conventional arrangement in which all image data is stored into the hard disk 12 without being compressed or all image data is stored into the hard disk 12 after being compressed. In other words, this allows for increase in a printing speed.

Further, in the present embodiment, each processing power of the hard disk 12, the image compressing device 14, and the image decompressing device 15 is the same as that in the conventional arrangement, and therefore there occurs no increase in the cost and technical difficulties in packaging and controlling do not exist.

As described above, the present embodiment allows printing at a speed which is beyond maximum abilities of the hard disk 12, the image compressing device 14, and the image decompressing device 15.

In the above explanation, the compressing rate of compressible image data is assumed to be constant. However, a compressing rate may be different according to compressible image data. Namely, the compressing rate may be different according to the type of each divided image data. Therefore, the following explains examples for determining which divided image data is classified into compressible image data according to the type of a divided image data.

Example 1

The present example is an example in which image data is color image data indicative of an image including a plurality of areas and the image data is divided according to color planes.

As described in Japanese Unexamined Patent Publication No. 151255/2005 (Tokukai 2005-151255; published on Jun. 9, 2005) for example, in the present example, the host device 2 causes printing data, corresponding to a document and an image such as a photograph which are to be printed, to include area data regarding respective areas into which the image is divided.

Here, area data includes information regarding the starting point of an area, the size of the area, attributes of the area, and the color of the area. In the printing data, the area data is represented as an aggregate in which definition descriptions described by a printer description language are related to each other. In order to specify the range of one area data (part data), there exists a delimiter mark which indicates a delimiter between one area data and other area data. In the present example, an example of the delimiter mark is a line feed code. However, the delimiter mark may be any mark as long as it is capable of being recognized as a delimiter mark by an area discriminating section.

Further, a definition description which is described by a printer description language and which is included in one area data defines various characteristics such as size (the size of an area in an image) and color (e.g. monochrome, color, single color, or multi-colors).

For example, a definition description "100 200 scale" indicates that the size of an area is 100×200. Further, a definition description "X X X setrgbcolor" indicates the color of an area. Namely, a definition description "0 0 0 setrgbcolor" indicates that the color is black (K) and a definition description "0 0 255 setrgbcolor" indicates that the color is blue (B). Here, the headmost three numbers in the definition description "0 0 255 setrgbcolor" correspond to "RGB".

The image data dividing section 22 in the present example divides image data (e.g. 60 [Mbyte]) generated by the image data generating section 21 into plural pieces of divided image data (e.g. 15 [Mbyte]) corresponding to black (K), cyan (C), magenta (M), and yellow (Y), respectively.

Further, the compression/non-compression determining section 23 in the present example calculates respective total sizes of K, C, M, Y in the image data, on the basis of the area data obtained from the host device 2. The compression/non-compression determining section 23 determines, on the basis of the total sizes thus calculated, target color planes whose divided image data should be classified as the compressible image data. Generally, a compressing rate of image data corresponding to a color whose total size is small is larger than that of image data corresponding to color whose total size is large. Using this characteristic, the compression/non-compression determining section 23 in the present example classifies pieces of divided image data corresponding to three color planes whose total sizes are small as the compressible image data.

Figure 4:
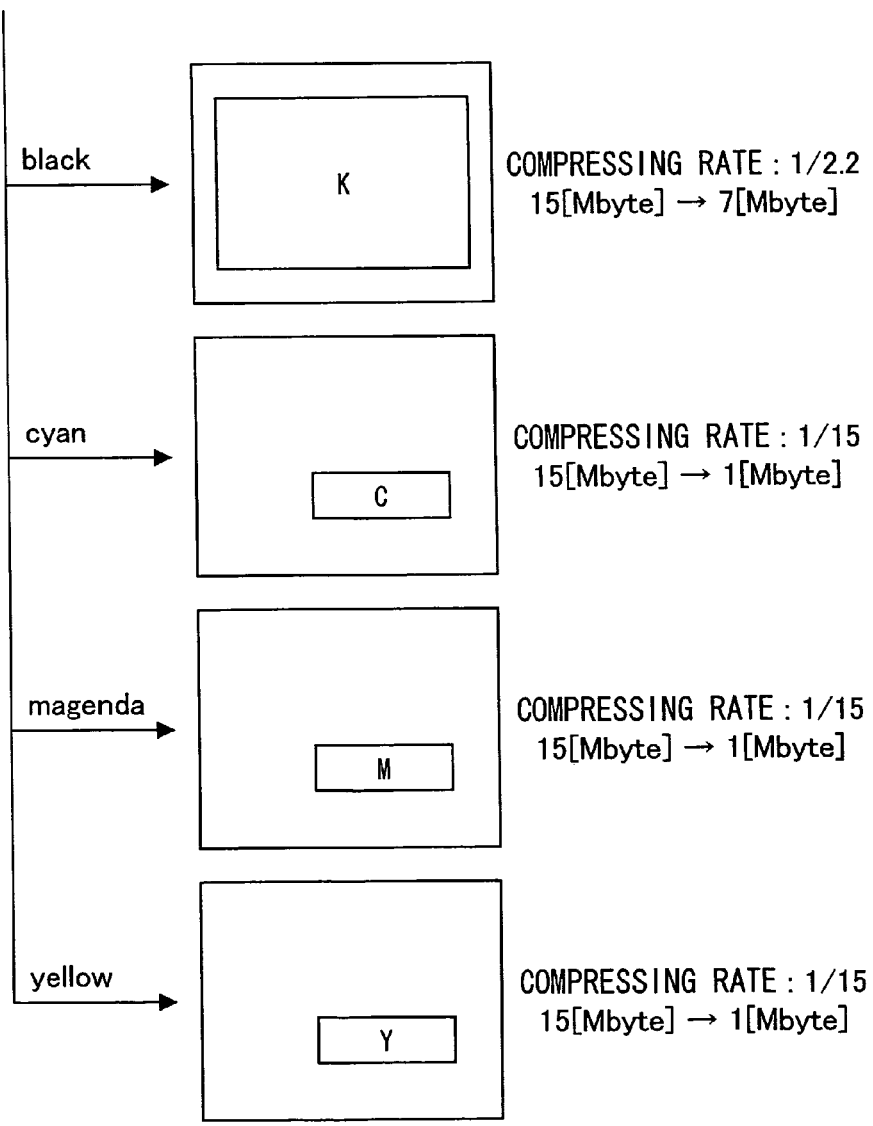
FIG. 4 illustrates an example of pieces of divided image data in Example 1.

FIG. 4 illustrates an example in which the image data dividing section 22 divides image data into plural pieces of divided image data corresponding to four colors of K, C, M, Y, respectively.

Here, assume that printing data transmitted from the host device 2 is data indicative of an image including a large monochrome area and a small colored area.

Further, it is assumed that 60 [Mbyte] of image data generated by the image data generating section 21 is compressed by the image compressing device 14 into 10 [Mbyte] of data and a compressing rate is 1/6. Under the circumstances, it is assumed that 15 [Mbyte] of each of the pieces of divided image data corresponding to color planes C, M, Y, existing only in a part of the image, is compressed by the image compressing device 14 into 1 [Mbyte] of data and a compressing rate is 1/15. Meanwhile, it is assumed that 15 [Mbyte] of the piece of divided image data corresponding to color plane K existing in the whole area of the image is compressed by the image compressing device 14 into 7 [Mbyte] of data and a compressing rate is 1/2.2.

The compression/non-compression determining section 23 calculates respective total sizes of areas having the color planes, on the basis of the area data included in the printing data. The results of the calculation show that a total size of an area having color plane K is larger than total sizes of areas having color planes C, M, Y.

On the basis of the results, the compression/non-compression determining section 23 classifies the pieces of divided image data corresponding to three color planes C, M, Y, whose total sizes are small, as compressible image data, and the compression/non-compression determining section 23 classifies the pieces of divided image data corresponding to color plane K as the non-compressible image data.

The writing/reading processing section 24 causes the image compressing device 14 to compress the pieces of divided image data corresponding to C, M, Y, each of which are the compressible image data, and the writing/reading processing section 24 causes the hard disk 12 to store the pieces of divided image data thus compressed. Further, the writing/reading processing section 24 also reads out the divided image data thus compressed from the hard disk 12 and causes the image decompressing device 15 to decompress the divided image data thus compressed.

Under the circumstances, an average compressing rate of the pieces of divided image data corresponding to C, M, Y, respectively, is 1/15, and a compressing speed of the image compressing device 14 and the decompressing speed of the image decompressing device 15 are 60 [Mbyte/sec], so that writing process speed and reading process speed of the compressed image data is 4 [Mbyte/sec] (=60 [Mbyte/sec]×1/15).

The writing/reading processing section 24 simultaneously performs writing/reading of the non-compressible image data and writing/reading of the compressed image data. Maximum processing speed of the hard disk 12 is 60 [Mbyte/sec] and therefore the writing/reading processing section 24 performs each of writing and reading of the non-compressible image data at (60 [Mbyte/sec]−4 [Mbyte/sec]×2)÷2=26 [Mbyte/sec].

Therefore, the writing/reading processing section 24 transmits, to the printing engine 16, compressible image data which is obtained by decompressing the compressed image data at a speed of 60 [Mbyte/sec] and non-compressible image data at a speed of 26 [Mbyte/sec]. Namely, a data processing speed of the printing engine 16 is 86 [Mbyte/sec] (=60 [Mbyte/sec]+26 [Mbyte/sec]).

A rate of the non-compressible image data to all image data inputted to the printing engine 16 is 26 [Mbyte/sec]÷86 [Mbyte/sec]=1/3.3.

If color planes of image data are not divided in terms of color plane, a compressing rate of the entire image data is 1/6 and therefore writing/reading of compressed image data is 10 [Mbyte/sec]. As such, each of writing and reading of non-compressible image data is performed at (60 [Mbyte/sec]−10 [Mbyte/sec]×2)÷2=20 [Mbyte/sec].

As a result, a data processing speed of the printing engine 16 is 80 [Mbyte/sec] (=60 [Mbyte/sec]+20 [Mbyte/sec]. Further, under the circumstances, a ratio of the non-compressible image data to the entire image data inputted to the printing engine 16 is 20 [Mbyte/sec]÷80 [Mbyte/sec]=1/4.

As described above, in the present example, image data is color image data and the image data dividing section 22 divides the color image data into plural pieces of divided image data corresponding to respective color planes. Further, on the basis of color planes existing in areas of the color image data, the compression/non-compression determining section 23 calculates respective sizes of the areas having color planes relative to a size of the whole area of the image. Then, on the basis of the result of the calculation, the compression/non-compression determining section 23 classifies one or more pieces of divided image data corresponding to one or more color planes whose area is small relative to the whole area of the image, as the compressible image data, and classifies one or more pieces of divided image data corresponding to other color planes as the non-compressible image data.

As described above, in a case of a monochrome image partially including color images, compressing rates of the pieces of divided image data corresponding to color planes C, M, Y which exist only in a part of the image are higher than a compressing rate of the piece of divided image data corresponding to color plane K.

The speed at which the compressible image data which has been compressed is written into the hard disk 12 is a value obtained by multiplying the compressing process speed of the image compressing device 14 by the compressing rate of the compressible image data which has been compressed. The non-compressible image data can be written into the hard disk 12 at a speed obtained by subtracting (i) a writing process speed at which the compressible image data which has been compressed is written into the hard disk 12 from (ii) a maximum processing speed at which data is written into the hard disk 12. In the same way, the speed at which the compressible image data which has been compressed is read out from the hard disk 12 is a value obtained by multiplying the decompressing speed of the image decompressing device 15 by the compressing rate of the compressible image data which has been compressed. The non-compressible image data can be read out from the hard disk 12 at a speed obtained by subtracting (i) a reading process speed at which the compressible image data which has been compressed is read out from the hard disk 12 from (ii) a maximum processing speed at which data is read out from the hard disk 12.

As a result, as a compressing rate of the compressible image data is higher, it is possible to increase the amount of non-compressible image data to be written into the hard disk 12 per unit time and the amount of non-compressible image data to be read from the hard disk 12 per unit time. Namely, it is possible to increase the amount of image data sent to the printing engine 16 per unit time. As a result, it is possible to further increase data processing speed (namely, printing speed) of the printing engine 16 (for example, the printing speed is 86 [Mbyte/sec] in the above example).

This is because: by classifying image data having a high compressing rate as the compressible image data, it is possible to increase writing/reading process speed of non-compressible image data (namely, it is possible to increase a ratio of the non-compressible image data to the entire image data inputted to the printing engine 16).

In the above explanation, the compression/non-compression determining section 23 determines as to a target color plane whose divided image data should be classified as the compressible image data, on the basis of the area data included in the printing data.

However, the present invention is not limited to this. The compression/non-compression determining section 23 may determine as to a target color plane whose divided image data should be classified as the compressible image data, in accordance with instructions entered by a user. For example, by entering instructions into the printing apparatus 1 by means of the host device 2, a user instructs the printing apparatus 1 to classify the pieces of divided image data corresponding to color planes C, M, Y as the compressible image data. In response to the entered instructions, the compression/non-compression determining section 23 classifies the pieces of divided image data corresponding to color planes C, M, Y as the compressible image data.

Further, the user enters image type information into the printing apparatus 1 by means of the host device 2. The compression/non-compression determining section 23 stores in advance a table in which image type information is associated with the type of a color plane of divided image data to be compressed. The compression/non-compression determining section 23 reads out, from the table, a color plane corresponding to the entered image type information, and classifies a pieces of divided image data corresponding to the read color plane as the compressible image data. For example, the compression/non-compression determining section 23 stores a table in which image type information indicative of a partially colored image including monochrome image in large area and color photographic image in small area is associated with color planes C, M, Y. Upon receiving the image type information indicative of the partially colored image, the compression/non-compression determining section 23 classifies the pieces of divided image data corresponding to color planes C, M, Y as the compressible image data.

Further, the compression/non-compression determining section 23 may be set so as to classify divided image data corresponding to a predetermined color plane as the compressible image data. For example, in a case of a printing apparatus which frequently prints a partially colored image including monochrome image in large area and color photographic image in small area, the user sets the compression/non-compression determining section 23 so that the divided image data corresponding to color planes C, M, Y are classified as the compressible image data. This allows for increase in a printing speed for the partially colored image which is frequently printed.

Example 2

The present example is an example in which image data is multi-valued image data (multi-bit image data) and the image data is divided for each bit plane. Further, in the present example, the image compressing device 14 performs JBIG (Joint Bi-level Image experts Group) compression.

The image data generating section 21 in the present example generates multi-valued (e.g. 3 bits) image data. The image data dividing section 22 in the present example divides the multi-valued image data by bit plane. For example, as illustrated in FIG. 5, in a case of 3-bit image data, the image data dividing section 22 divides 60 [Mbyte] of image data into (i) image data corresponding to a first bit plane (MSB plane), (ii) image data corresponding to a second bit plane, and (iii) image data corresponding to a third bit plane (LSB plane), each of which data has 20 [Mbyte].

When multi-valued image data is divided in terms of bit plane, there is a tendency that an LSB plane has a large amount of high frequency components and an MSB plane has a small amount of high frequency components. As a result, the MSB plane has a higher compressing rate than the LSB plane.

Therefore, the compression/non-compression determining section 23 classifies divided image data corresponding to a predetermined bit plane including at least an LSB plane (corresponding to a third bit plane (LSB plane) for example) into non-compressible image data, and classifies divided image data corresponding to the other bit planes including at least an MSB plane (corresponding to a first bit plane (MSB plane) and a second bit plane) into compressible image data.

Figure 5:
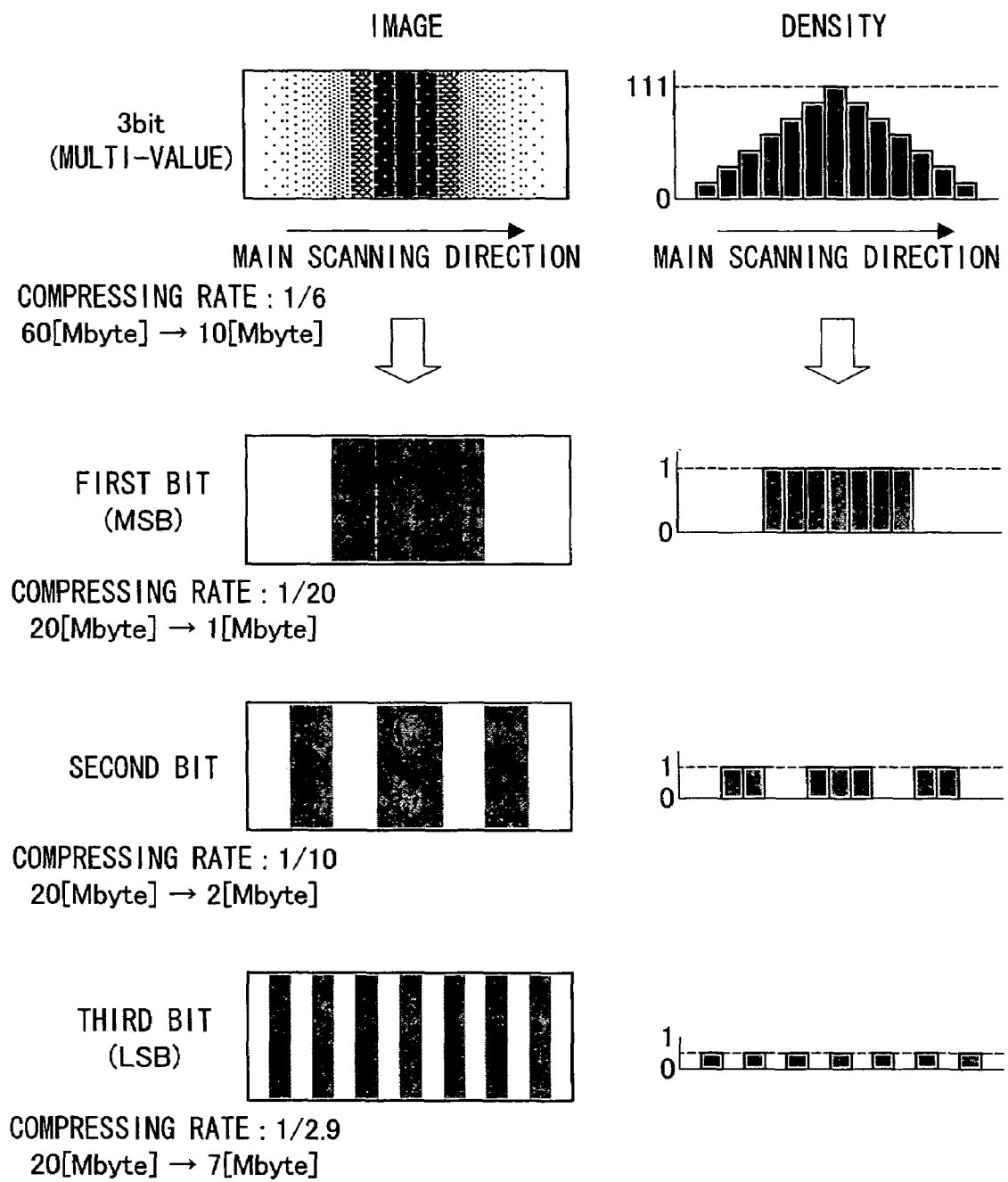
FIG. 5 illustrates an example of pieces of divided image data in Example 2.
Figure 7:
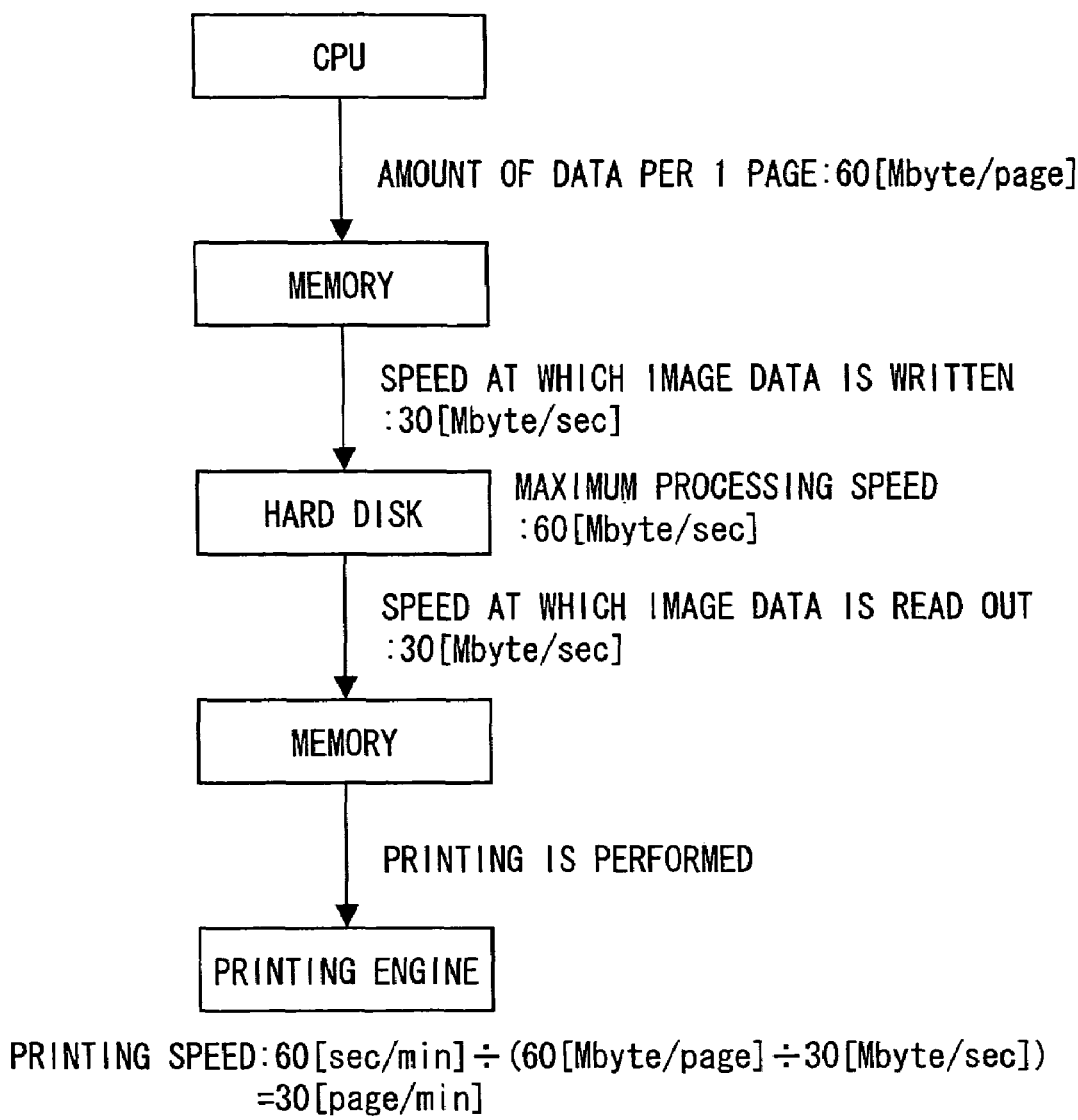
FIG. 7 is a data flow chart illustrating a conventional flow of image data.
Figure 8:
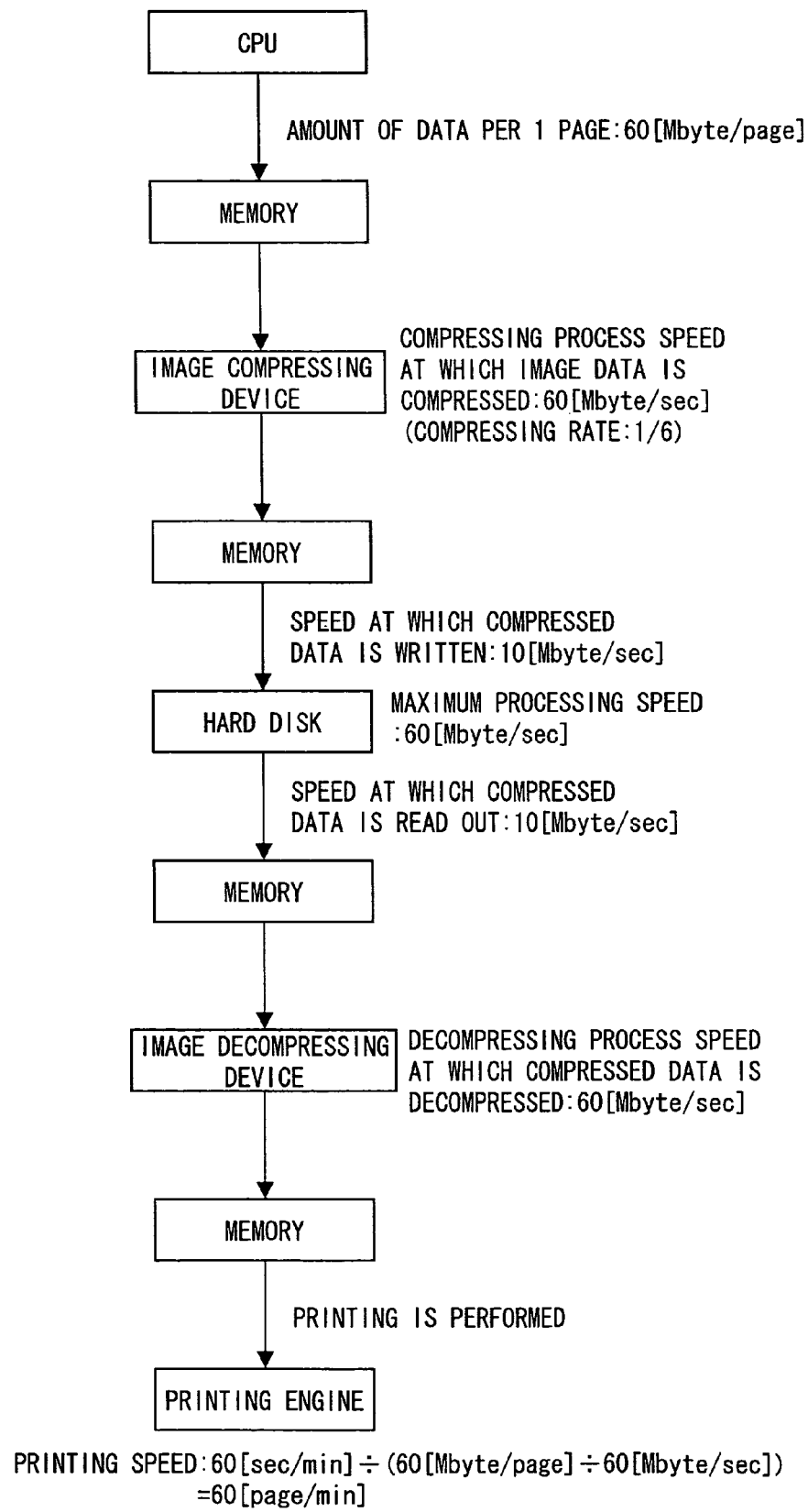
FIG. 8 is another data flow chart illustrating a conventional flow of image data.

With reference to FIG. 5, the following will specifically describes a printing process in the present example.

Here, it is assumed that an image compressing device compresses 60 [Mbyte] of image data generated by the image data generating section 21 into 10 [Mbyte] of data and a compressing rate is 1/6. Under the circumstances, it is assumed that, as illustrated in FIG. 5, the image compressing device 14 compresses 20 [Mbyte] of image data corresponding to the first bit plane (MSB plane) into 1 [Mbyte] of data and a compressing rate is 1/20. Further, it is assumed that the image compressing device 14 compresses 20 [Mbyte] of image data corresponding to the second bit plane into 2 [Mbyte] of data and a compressing rate is 1/10. Further, the image compressing device 14 compresses 20 [Mbyte] of image data corresponding to the third bit plane (LSB plane) into 7 [Mbyte] of data and a compressing rate is 1/2.9.

As described above, the compression/non-compression determining section 23 classifies the third bit plane (LSB plane) into non-compressible image data and classifies the first bit plane (MSB plane) and the second bit plane into compressible image data.

The writing/reading processing section 24 causes the image compressing device 14 to compress the compressible image data and causes the hard disk 12 to store the compressible image data which has been compressed.

Under the circumstances, an average compressing rate of the compressible image data is (1 [Mbyte]+2 [Mbyte])/(20 [Mbyte]×2)=1/13.3

Further, a compressing speed of the image compressing device 14 and a decompressing speed of the image decompressing device 15 are 60 [Mbyte/sec] and therefore a writing process speed and a reading process speed of compressed image data is 3 [Mbyte/sec] (=60 [Mbyte/sec]×1/13.3).

The writing/reading processing section 24 simultaneously performs writing/reading of the compressible image data and writing/reading of the non-compressible image data with respect to the hard disk 12. The hard disk 12 has a maximum processing speed of 60 [Mbyte] and therefore the writing/reading processing section 24 performs writing/reading of non-compressible image data at a speed of (60 [Mbyte/sec]−3 [Mbyte/sec]×2)÷2=27 [Mbyte/sec].

As a result, the writing/reading processing section 24 outputs, to the printing engine 16, compressible image data which is obtained by decompressing compressed image data at a speed of 60 [Mbyte/sec], and non-compressible image data at a speed of 27 [Mbyte/sec]. Namely, a data processing speed of the printing engine 16 is 87 [Mbyte/sec] (=60 [Mbyte/sec]+27 [Mbyte/sec]).

Note that, a ratio of non-compressible image data to all image data inputted to the printing engine is 27 [Mbyte/sec] ÷87 [Mbyte/sec]=1/3.2

If image data is not divided in terms of bit plane, a compressing rate of the entire image data is ⅙ and therefore a writing/reading process speed of compressed data is 10 [Mbyte/sec]. As a result, each of writing and reading of non-compressible image data is performed at a speed of (60 [Mbyte/sec]−10 [Mbyte/sec]×2)÷2=20 [Mbyte/sec]. Further, under the circumstances, a ratio of the non-compressible image data to the entire image data inputted to the printing engine is 20 [Mbyte/sec]÷80 [Mbyte/sec]=¼.

As a result, a printing speed is 80 [Mbyte/sec] (=60 [Mbyte/sec]+20 [Mbyte/sec]).

As described above, in the present example, image data is divided in terms of bit plane, image data corresponding to an LSB plane having a large amount of high frequency components is classified as the non-compressible image data and image data corresponding to other bit planes is classified as the compressible image data. This allows for a further increase in the printing speed (for example, 87 [Mbyte/sec] in the above example).

This is because: by classifying image data corresponding to a bit plane with a high compressing rate as the compressible image data and classifying image data corresponding to a bit plane with a low compressing rate as the non-compressible image data, it is possible to increase the speed in writing/reading non-compressible image data (namely, it is possible to increase a ratio of the non-compressible image data to the entire image data inputted to the printing engine).

Example 3

In Example 1, the compression/non-compression determining section 23 makes determines whether to compress image data or not by use of a high compressing rate of image data corresponding to a color plane existing in a small area. Further, in Example 2, the compression/non-compression determining section 23 determines whether to compress image data or not by use of a low compressing rate of image data corresponding to an LSB plane. However, an exact compressing rate of the image data cannot be known until after the image compressing device 14 compresses image data.

Further, monochrome image data or 1-bit image data cannot be basically divided in terms of color plane or bit plane.

The present example is an example in which a compressing rate is more exactly calculated and the most suitable ratio of compressible image data to non-compressible image data is calculated.

The image data dividing section 22 in the present example divides one-page image data generated by the image data generating section 21 into plural pieces of band data (pieces of divided image data). For example, as illustrated in FIG. 6, the image data dividing section 22 divides 60 [Mbyte] of one-page image data into 600 pieces of divided image data.

For each page, the compression/non-compression determining section 23 of the present example classifies a predetermined number (e.g. 60 pieces) of pieces of divided image data as the compressing-rate-calculation-use image data, and the compressing-rate-calculation-use image data thus classified is subjected to a compressing process carried out by the image compressing device 14. The compression/non-compression determining section 23 calculates a compressing rate on the basis of the amount of the compressing-rate-calculation-use image data and the amount of the compressing-rate-calculation-use image data thus compressed. The compression/non-compression determining section 23 determines the most suitable ratio of compressible image data to non-compressible image data (namely, a ratio of (i) a maximum amount of compressible image data thus compressed to be read out per unit time from the hard disk 12 to (ii) a maximum amount of non-compressible image data to be read out per unit time from the hard disk 12) by the following equation.

Compressible image data:non-compressible image data=$c:(b-2ac)/2$ where a is an obtained compressing rate, b is a maximum processing speed of the hard disk 12, and c is a processing speed of the image compressing device 14 and the image decompressing device 15.

The compression/non-compression determining section 23 determines the non-compressible image data and the compressible image data on the basis of the determined ratio.

For example, it is assumed that 60 pieces of compressing-rate-calculation-use image data (6 [Mbyte]) are compressed by the image compressing device 14 into 0.4 [Mbyte] of data. At that time, the compression/non-compression determining section 23 obtains 1/15 as a compressing rate.

From a predetermined compressing process speed of the image compressing device 14, i.e. 60 [Mbyte/sec], the compression/non-compression determining section 23 calculates a processing time for the image compressing device 14 to compress 6 [Mbyte] of the compressing-rate-calculation-use image data by the following equation:

0.1 [sec]=6 [Mbyte]÷60 [Mbyte/sec].

Further, from the maximum processing speed of the hard disk 12, i.e. 60 [Mbyte/sec], the compression/non-compression determining section 23 calculates the amount of processable data of the hard disk 12 within the thus calculated processing time, by the following equation:

6 [Mbyte]=0.1 [sec]×60 [Mbyte/sec].

Then, the compression/non-compression determining section 23 calculates the amount of non-compressible image data which has been written into the hard disk 12 on the basis of the following equation, thereby obtaining the number of pieces of divided image data which are the non-compressible image data.

(6 [Mbyte/sec]−(0.4 [Mbyte]×2))÷2)=2.6 [Mbyte] (corresponding to 26 [band])

The compression/non-compression determining section 23 determines a ratio of compressible image data to non-compressible image data as 60:26 on the basis of the result of the calculation, so as to determine whether each divided image data is to be compressed or not.

As a result, 6 [Mbyte] of compressible image data which has been decompressed and 2.6 [Mbyte] of non-compressible image data are inputted to the printing engine 16 for each 0.1 [sec]. That is, data processing speed of the printing engine is 86 [Mbyte/sec], which is higher than a conventional data processing speed.

As described above, in the present example, one-page image data is divided into plural pieces of band data and a predetermined number of pieces of band data are subjected to a compressing process. At that time, a ratio of compressible image data to non-compressible image data is determined on the basis of a compressing rate of the predetermined number of pieces of band data. By repeating this process, it is possible to determine the ratio of compressible image data to non-compressible image data, which ratio is most suitable for image quality of each band data. This allows for increase in a printing speed.

Note that, in the above explanation, image data corresponding to one page is divided into plural pieces of band data, and part of pieces of band data is subjected to a compressing process. At that time, the ratio of compressible image data to non-compressible image data is determined on the basis of the compressing rate for the part of pieces of the band data thus compressed. However, in a case of printing data corresponding to two or more pages, the present invention may be arranged so that: image data corresponding to a predetermined number of pages is compressed, and then a ratio of compressible image data to non-compressible image data is determined on the basis of a compressing rate of the image data corresponding to the predetermined number of pages. Note that, in this case, after the image data corresponding to the predetermined number of pages is compressed, writing of image data into the hard disk begins. This delays the start of the writing process. Besides, since all data is required to store in memory prior to writing into the hard disk, a large-capacity memory is required.

Further, the printing apparatus according to the present invention can be expressed as follows.

Namely, in an electronic sorting process of the printing apparatus 1 which includes the memory 13, the hard disk 12, the image compressing device 14, the image decompressing device 15, and the printing engine 16, and which causes the image compressing device 14 to compress image data stored in the memory 13 and then stores the compressed image data into the hard disk 12, and performs printing process undergoing the following processes: reading out any compressed image data from the hard disk 12 in a printing order; causing the image decompressing device 15 to decompress the image data thus read out; and then transmitting the image data thus decompressed to the printing engine 16 for printing, wherein: at the time of storing image data into the hard disk 12, part of the image data is compressed by the image compressing device 14 and stored into the hard disk 12, and other part of the image data is directly stored as non-compressible data into the hard disk 12, and at the time of printing, out of the data read out from the hard disk 12, the compressed image data is decompressed by the image decompressing device 15 and then transmitted to the printing engine 16, and non-compressible image data is directly transmitted to the printing engine 16 for the printing process.

Thus, part of data is compressed and the other part of data is processed without being compressed. This makes it possible to realize printing performance beyond maximum processing abilities of the image compressing device, the image decompressing device, and hard disk.

Further, in a process of printing a color image performed by the printing apparatus 1, it is preferable that the procedure is performed under circumstances where image data corresponding to a specific color is compressed and image data corresponding to other color is not compressed. With this arrangement, in case of an image including colors whose compressing rates are different, for example, in case of a monochrome-based image including a small amount of color data, black data having a low compressing rate is not compressed and other data is compressed. This makes it possible to reduce the amount of all data written into/read from the hard disk, thus improving the performance of the printing process.

Further, in a process of printing a multi-valued image performed in the printing apparatus 1, it is preferable that the procedure is performed under circumstances where image data corresponding to a specific plane is compressed and image data corresponding to other color is not compressed. With this arrangement, when multi-valued image data is divided for each bit plane, there may occur an unbalanced situation where data corresponding to an MSB plane has a small amount of high frequency components and data corresponding to an LSB plane has a large amount of high frequency components. When JBIG-compressed, the data corresponding to an MSB plane having a small amount of high frequency components has a high compressing rate and the data corresponding to an LSB plane having a large amount of high frequency components has a low compressing rate. Therefore, the data corresponding to the plane having a high compressing rate is compressed and the data corresponding to the plane having a lower compressing rate is not compressed. This makes it possible to reduce the total amount of data written into/read from the hard disk, thus improving the performance of the printing process.

Further, in the foregoing printing apparatus 1, it is preferable that the procedure is performed under circumstances where image data stored in the memory 13 is divided into pieces of band data each of which has a specific amount, pieces of the band data in a specific proportion to the entire band data is compressed, and the other pieces of the band data is not compressed. By sequentially compressing the band data in this way, a compressing rate is sequentially found. Therefore, it is possible change the amount of data (number of bands) not to be compressed while considering a margin for the performance of the hard disk. This makes it possible to increase the performance of the printing process to the performance limit of the hard disk.

Each block of the printing apparatus 1, particularly the control section 17, may be realized by hardware logic or may be realized by software by using a CPU as indicated below.

Namely, the control section 17 of the printing apparatus 1 includes: a CPU (central processing unit) for carrying out a command of a control program for realizing functions; a ROM (read only memory) that stores the program; a RAM (random access memory) that develops the program; a storage device (storage medium) such as a program memory for storing the program and various data items; and the like. The object of the present invention also can be realized in such a manner that the printing apparatus 1 is provided with a computer-readable storage medium for storing program code (such as executable program, intermediate code program, and source program) of a control program of the printing apparatus 1 which program serves as software for realizing the functions, and the computer (alternatively, CPU or MPU) reads out and executes the program code stored in the storage medium.

The storage medium is, for example, tapes such as a magnetic tape and a cassette tape, or discs such as magnetic discs (e.g. a Floppy Disc®) and a hard disk), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the printing apparatus 1 may be arranged so as to be connectable to a communications network so that the program code is supplied to the printing apparatus 1 through the communications network. The communication network is not to be particularly limited. Examples of the communication network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

Note that, the present invention is applicable to a printing apparatus such as a printer and a multifunctional machine.

As described above, the printing apparatus according to the present invention is a printing apparatus which includes a storage section which stores image data therein, image compressing means for compressing image data, image decompressing means for decompressing compressed image data, and a printing engine for performing printing on the basis of image data, the printing apparatus comprising: dividing means for dividing image data into plural pieces of divided image data; compression/non-compression determining means for classifying one or more pieces of the divided image data as compressible image data and classifying one or more other pieces of the divided image data as non-compressible image data; writing means for causing the image compressing means to compress the compressible image data, writing the compressible image data thus compressed into the storage section, and for writing the non-compressible image data into the storage section; and reading means for reading the non-compressible image data and the compressible image data thus compressed from the storage section, transmitting the non-compressible image data thus read to the printing engine, causing the image decompressing means to decompress the compressible image data thus compressed, and transmitting the compressible image data thus decompressed to the printing engine.

The printing processing method according to the present invention is a printing processing method in a printing apparatus which includes a storage section which stores image data therein, image compressing means for compressing image data, image decompressing means for decompressing compressed image data, and a printing engine for performing printing on the basis of image data, the method comprising: a division step of dividing image data into plural pieces of divided image data; a compression/non-compression determining step of classifying one or more pieces of the divided image data as compressible image data and classifying one or more other pieces of the divided image data as non-compressible image data; a writing step of causing the image compressing means to compress the compressible image data, writing the compressible image data thus compressed into the storage section, and writing the non-compressible image data into the storage section; and a reading step of reading the non-compressible image data and the compressible image data thus compressed from the storage section, transmitting the non-compressible image data thus read to the printing engine, causing the image decompressing means to decompress the compressible image data thus compressed, and transmitting the compressible image data thus decompressed to the printing engine.

With the arrangement, the compressible image data, which is a part of the image data, is stored in the storage section after being compressed by the image compressing means. Here, the speed at which the compressible image data which has been compressed is written into the storage section is a value obtained by multiplying a compressing process speed of the image compressing means by a compressing rate of the compressible image data which has been compressed. The non-compressible image data, which is the rest of the image data, is stored in the storage section without being compressed. Therefore, the non-compressible image data can be written into the storage section at the speed obtained by subtracting (i) a writing process speed at which the compressible image data which has been compressed is written into the storage section from (ii) the maximum speed at which the image data is written into the storage section. Consequently, it is possible to increase the amount of image data written per unit time into the storage section, compared with a conventional technique in which the entire image data is compressed and then written in the storage section.

Further, in causing the printing engine to perform printing, the printing apparatus reads out the non-compressible image data and the compressible image data which has been compressed from the storage section, transmits the non-compressible image data to the printing engine, causes the image decompressing means to decompress the compressible image data, and transmits the compressible image data which has been decompressed to the printing engine. Here, the speed at which the compressible image data which has been compressed is read out from the storage section is a value obtained by multiplying a decompressing process speed of the image decompressing means and a compressing rate of the compressible image data which has been compressed. The non-compressible image data can be read out from the storage section at the speed obtained by subtracting (i) a reading process speed at which the compressible image data which has been compressed is read out from the storage section from (ii) the maximum speed at which the image data is read out from the storage section. This makes it possible to increase the amount of image data read out per unit time from the storage section, compared with a conventional technique in which the entire image data is compressed and then written in the storage section. Consequently, it is possible to increase printing speed of the printing engine.

As described above, it is possible to increase the printing speed, without increasing each processing power of the image compressing means, the image decompressing means, and the storage section. As a result, it is possible to realize a printing sped higher than in a conventional technique, without increase in the cost and technical difficulties in packaging and controlling.

Further, in addition to the above arrangement, the printing apparatus according to the present invention is a printing apparatus, wherein: the image data is color image data, the dividing means divides the color image data into pieces of divided image data corresponding to respective color planes, the compression/non-compression determining means classifies one or more pieces of the divided image data corresponding to one or more predetermined color planes as the compressible, image data, and classifies one or more pieces of the divided image data corresponding to one or more other color planes as the non-compressible image data.

Compressing rates of pieces of divided image data can be varied depending upon color planes. For example, in a case of a monochrome image partially including color images, compressing rates of the pieces of divided image data corresponding to color planes C, M, Y which exist only in a part of the image are higher than a compressing rate of the piece of divided image data corresponding to color plane K.

With the arrangement, for example, the dividing means divides color image data into pieces of divided image data corresponding to color planes K, C, M, Y and the compression/non-compression determining means classifies pieces of divided image data corresponding to color planes C, M, Y as compressible image data. As a result, in a case of a monochrome image partially including color images as described previously, it is possible to classify pieces of divided image data corresponding to the color planes having a high compressing rate as the compressible image data.

As described above, the speed at which the compressible image data which has been compressed is written in the storage section is a value obtained by multiplying the compressing process speed of the image compressing means and the compressing rate of the compressible image data which has been compressed. The non-compressible image data can be written into the storage section at a speed obtained by subtracting (i) a writing process speed at which the compressible image data which has been compressed is written in the storage section from (ii) a maximum processing speed at which data is written into the storage section. In the same way, the speed at which the compressible image data which has been compressed is read out from the storage section is a value obtained by multiplying the decompressing speed of the image decompressing means by the compressing rate of the compressible image data which has been compressed. The non-compressible image data can be read out from the storage section at a speed obtained by subtracting (i) a reading process speed at which the compressible image data which has been compressed is read out from the storage section from (ii) a maximum processing speed at which data is read out from the storage section.

As a result, as a compressing rate of the compressible image data is higher, it is possible to increase the amount of non-compressible image data to be written into the storage section per unit time and the amount of non-compressible image data to be read from the storage section per unit time. Namely, it is possible to increase the amount of image data sent to the printing engine per unit time. As a result, it is possible to further increase a printing speed.

Further, in addition to the above arrangement, the printing apparatus according to the present invention is a printing apparatus, wherein: the image data is color image data indicative of an image constituted by a plurality of areas, the dividing means divides the color image data into pieces of divided image data corresponding to respective color planes, and the compression/non-compression determining means calculates respective sizes of the areas having color planes relative to a size of the whole area of the image, on the basis of color planes existing in the areas of the color image data, and the compression/non-compression determining means classifies, as the compressible image data, one or more pieces of the divided image data corresponding to one or more color planes whose area is small relative to the whole area of the image, and classifies one or more pieces of the divided image data corresponding to one or more other color planes as the non-compressible image data, the classification being performed on the basis of a result of the calculation.

With the arrangement, one or more pieces of divided image data corresponding to the color planes whose area is small relative to the whole area of the image is classified as the compressible image data, and other one or more pieces of divided image data corresponding to other color planes is classified as the non-compressible image data. Generally, a compressing rate of a piece of divided image data corresponding to a color plane whose area is small relative to the whole area of the image is higher than that of a piece of divided image data corresponding to a color plane whose area is large relative to the whole area of the image.

As a result, it is possible to increase the amount of non-compressible image data to be written into the storage section per unit time and the amount of non-compressible image data to be read from the storage section per unit time. Namely, it is possible to increase the amount of image data sent to the printing engine per unit time. As a result, it is possible to further increase a printing speed.

Further, in addition to the above arrangement, the printing apparatus according to the present invention is a printing apparatus, wherein: the image data is color image data, the dividing means divides the color image data into pieces of divided image data corresponding to respective color planes, and the compression/non-compression determining means classifies one or more pieces of the divided image data corresponding to specific one or more color planes as the compressible image data, and classifies one ore more pieces of the divided image data corresponding to one or more other color planes into the non-compressible image data, the classification being performed on the basis of instructions entered by a user.

With the arrangement, the user can specify a color plane of divided image data to be classified as the compressible image data. For example, the user can specify, as the compressible image data, a piece of divided image data corresponding to a color plane whose area is small relative to the whole area of the image. Alternatively, the user can enter a color plane which exists only in part of the image. According to the instructions entered by the user, the compression/non-compression determining section classifies, as the compressible image data, a piece of divided image data corresponding to the color plane which exists only in part of the image.

Generally, a compressing rate of a piece of divided image data corresponding to a color plane whose area is small relative to the whole area of the image is higher than that of a piece of divided image data corresponding to a color plane whose area is large relative to the whole area of the image.

As a result, it is possible to increase the amount of non-compressible image data to be written into the storage section per unit time and the amount of non-compressible image data to be read from the storage section per unit time. Namely, it is possible to increase the amount of image data sent to the printing engine per unit time. As a result, it is possible to further increase a printing speed.

Further, in addition to the above arrangement, the printing apparatus according to the present invention is a printing apparatus, wherein: the image data is multi-bit image data, the dividing means divides the multi-bit image data into pieces of divided image data corresponding to respective bit planes, and the compression/non-compression determining means classifies one or more pieces of the divided image data corresponding to one or more predetermined bit planes at least including an MSB plane as the compressible image data, and classifies one or more pieces of the divided image data corresponding to one ore more other color planes including an LSB plane as the non-compressible image data.

Here, MSB is an abbreviation for Most Significant Bit, and LSB is an abbreviation for Least Significant Bit.

Generally, in a case of multi-bit image data, a compressing rate of a piece of divided image data corresponding to a more significant bit plane including a MSB plane is higher than a compressing rate of a piece of divided image data corresponding to a less significant bit plane including a LSB plane.

With the arrangement, divided image data corresponding to a predetermined bit plane at least including a MSB plane whose compressing rate is high is classified into compressible image data. As a result, it is possible to increase the amount of non-compressible image data to be written into the storage section per unit time and the amount of non-compressible image data to be read from the storage section per unit time. Namely, it is possible to increase the amount of image data sent to the printing engine per unit time. As a result, it is possible to further increase a printing speed.

Further, in addition to the above arrangement, the printing apparatus according to the present invention is a printing apparatus, wherein: the dividing means divides the image data into pieces of band data each of which has a predetermined size, and the compression/non-compression determining means causes the image compressing means to compress one or more pieces of the band data, and calculates a ratio of (i) a maximum amount of the compressible image data thus compressed to be read out per unit time from the storage section to (ii) a maximum amount of the non-compressible image data to be read out per unit time from the storage section, on the basis of a compressing rate of the band data, a compressing process speed of the image compressing means, a decompressing process speed of the image decompressing means, and a processing speed of the storage section, and the compression/non-compression determining means classifies the pieces of the band data as the compressible image data and the non-compressible image data, on the basis of the ratio thus calculated.

With the arrangement, the ratio of (i) the maximum amount of the compressible image data thus compressed to be read out per unit time from the storage section to (ii) the maximum amount of non-compressible image data to be read out per unit time from the storage section is determined on the basis of a compressing rate of part of pieces of band data, compressing process speed of the image compressing means, decompressing process speed of the image decompressing means, and processing speed of the storage section.

As a result, it is possible to increase the amount of image data sent to the printing engine per unit time. Consequently, it is possible to further increase a printing speed.

Note that, the printing apparatus may be realized by using a computer. At that time, (i) a printing processing program which realizes a printing apparatus by means of a computer by causing the computer to function as the foregoing means of the printing apparatus and (ii) a computer-readable storage medium which stores the program, are also within the scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A printing apparatus which includes a storage section which stores image data therein, image compressing means for compressing image data, image decompressing means for decompressing compressed image data, and a printing engine for performing printing on the basis of image data, the printing apparatus comprising:
   dividing means for dividing image data into plural pieces of divided image data;
   compression/non-compression determining means for classifying one or more pieces of the divided image data as compressible image data and classifying one or more other pieces of the divided image data as non-compressible image data;
   writing means for causing the image compressing means to compress the compressible image data, writing the compressible image data thus compressed into the storage section, and for writing the non-compressible image data into the storage section; and
   reading means for reading the non-compressible image data and the compressible image data thus compressed from the storage section, transmitting the non-compressible image data thus read to the printing engine, causing the image decompressing means to decompress the compressible image data thus compressed, and transmitting the compressible image data thus decompressed to the printing engine.

2. The printing apparatus as set forth in claim 1, wherein:
   the image data is color image data,
   the dividing means divides the color image data into pieces of divided image data corresponding to respective color planes,
   the compression/non-compression determining means classifies one or more pieces of the divided image data corresponding to one or more predetermined color planes as the compressible image data, and classifies one or more pieces of the divided image data corresponding to one or more other color planes as the non-compressible image data.

3. The printing apparatus as set forth in claim 1, wherein:
   the image data is color image data indicative of an image constituted by a plurality of areas,
   the dividing means divides the color image data into pieces of divided image data corresponding to respective color planes, and
   the compression/non-compression determining means calculates respective sizes of the areas having color planes relative to a size of the whole area of the image, on the basis of color planes existing in the areas of the color image data, and the compression/non-compression determining means classifies, as the compressible image data, one or more pieces of the divided image data corresponding to one or more color planes whose area is small relative to the whole area of the image, and classifies one or more pieces of the divided image data corresponding to one or more other color planes as the non-compressible image data, the classification being performed on the basis of a result of the calculation.

4. The printing apparatus as set forth in claim 1, wherein:
   the image data is color image data,
   the dividing means divides the color image data into pieces of divided image data corresponding to respective color planes, and
   the compression/non-compression determining means classifies one or more pieces of the divided image data corresponding to specific one or more color planes as the compressible image data, and classifies one or more pieces of the divided image data corresponding to one or more other color planes into the non-compressible image data, the classification being performed on the basis of instructions entered by a user.

5. The printing apparatus as set forth in claim 1, wherein:
the image data is multi-bit image data,
the dividing means divides the multi-bit image data into pieces of divided image data corresponding to respective bit planes, and
the compression/non-compression determining means classifies one or more pieces of the divided image data corresponding to one or more predetermined bit planes at least including an MSB plane as the compressible image data, and classifies one or more pieces of the divided image data corresponding to one or more other color planes including an LSB plane as the non-compressible image data.

6. The printing apparatus as set forth in claim 1, wherein:
the dividing means divides the image data into pieces of band data each of which has a predetermined size, and
the compression/non-compression determining means causes the image compressing means to compress one or more pieces of the band data, and calculates a ratio of (i) a maximum amount of the compressible image data thus compressed to be read out per unit time from the storage section to (ii) a maximum amount of the non-compressible image data to be read out per unit time from the storage section, on the basis of a compressing rate of the band data, a compressing process speed of the image compressing means, a decompressing process speed of the image decompressing means, and a processing speed of the storage section, and the compression/non-compression determining means classifies the pieces of the band data as the compressible image data and the non-compressible image data, on the basis of the ratio thus calculated.

7. A printing processing method in a printing apparatus which includes a storage section which stores image data therein, image compressing means for compressing image data, image decompressing means for decompressing compressed image data, and a printing engine for performing printing on the basis of image data, the method comprising:
   a division step of dividing image data into plural pieces of divided image data;
   a compression/non-compression determining step of classifying one or more pieces of the divided image data as compressible image data and classifying one or more other pieces of the divided image data as non-compressible image data;
   a writing step of causing the image compressing means to compress the compressible image data, writing the compressible image data thus compressed into the storage section, and writing the non-compressible image data into the storage section; and
   a reading step of reading the non-compressible image data and the compressible image data thus compressed from the storage section, transmitting the non-compressible image data thus read to the printing engine, causing the image decompressing means to decompress the compressible image data thus compressed, and transmitting the compressible image data thus decompressed to the printing engine.

8. A computer-readable medium for storing a printing processing program for operating a printing apparatus which includes a storage section which stores image data therein, image compressing means for compressing image data, image decompressing means for decompressing compressed image data, and a printing engine for performing printing on the basis of image data, the program causing a computer to carry out:
   a division step of dividing image data into plural pieces of divided image data;
   a compression/non-compression determining step of classifying one or more pieces of the divided image data as compressible image data and classifying one or more other pieces of the divided image data as non-compressible image data;
   a writing step of causing the image compressing means to compress the compressible image data, writing the compressible image data thus compressed into the storage section, and writing the non-compressible image data into the storage section; and
   a reading step of reading the non-compressible image data and the compressible image data thus compressed from the storage section, transmitting the non-compressible image data thus read to the printing engine, causing the image decompressing means to decompress the compressible image data thus compressed, and transmitting the compressible image data thus decompressed to the printing engine.

* * * * *